2 Sheets—Sheet 1.
J. ERICSSON.
WATER METER.
No. 7,869. Patented Jan. 1, 1851.
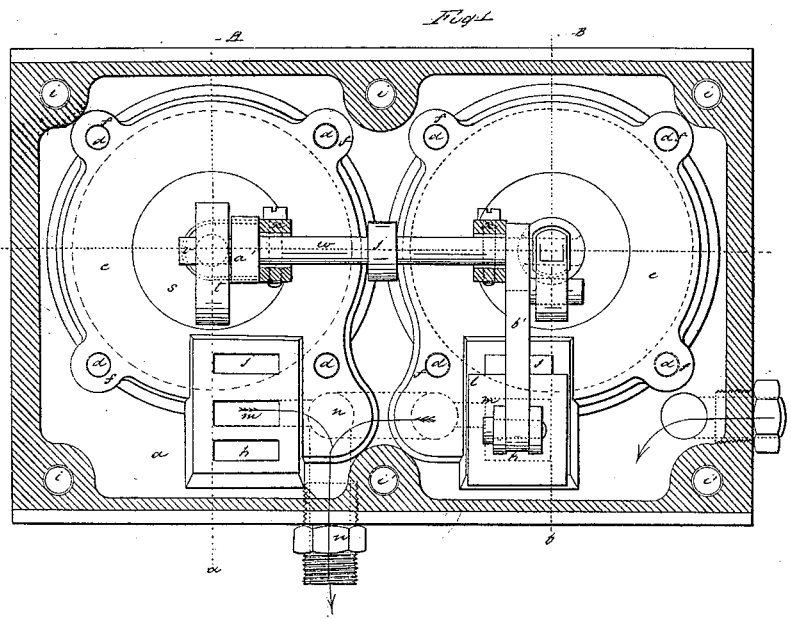
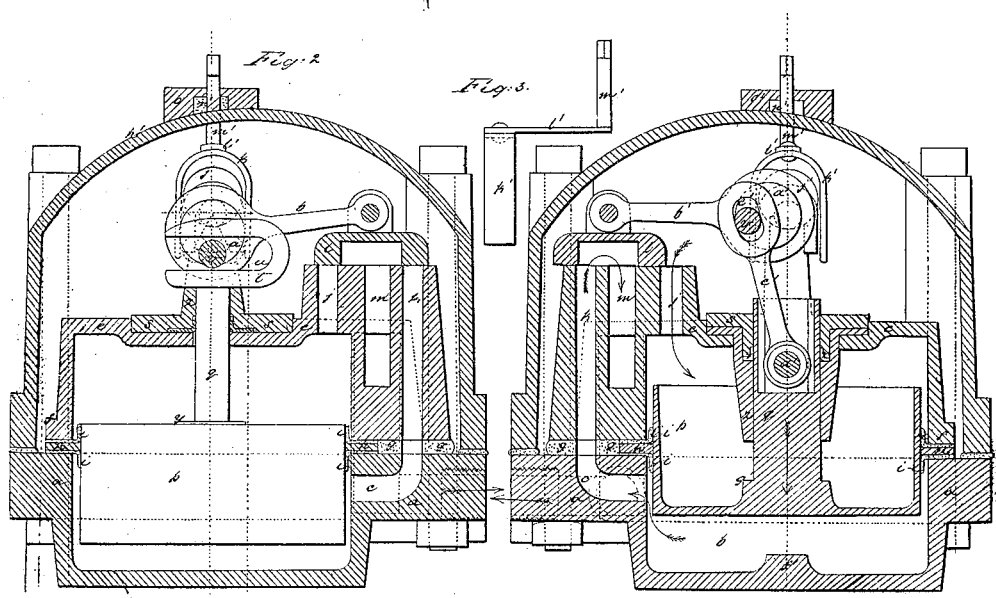

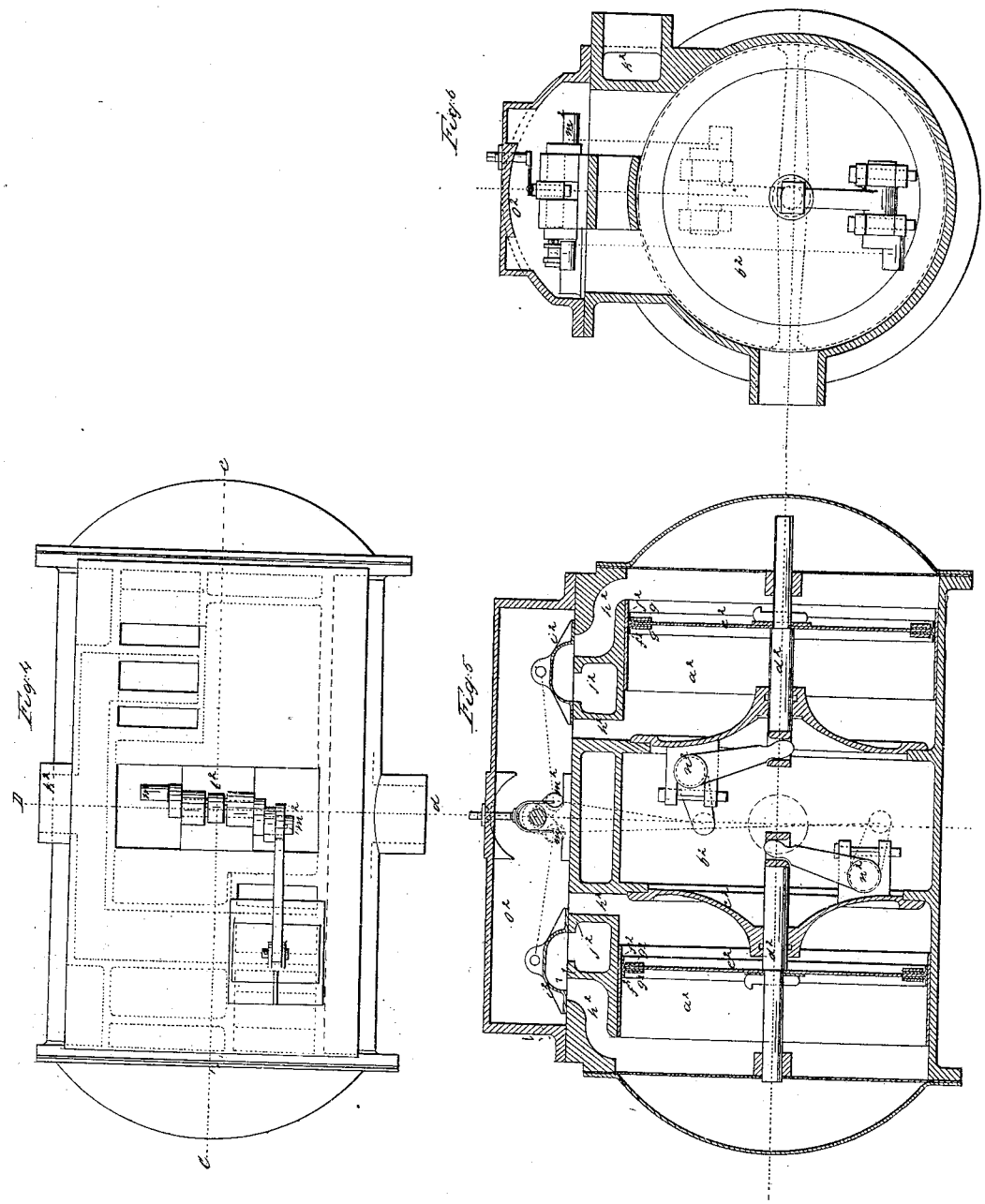

UNITED STATES PATENT OFFICE.

JNO. ERICSSON, OF NEW YORK, N. Y.

WATER-METER.

Specification of Letters Patent No. 7,869, dated January 1, 1851.

*To all whom it may concern:*

Be it known that I, JOHN ERICSSON, of the city, county, and State of New York, have invented certain new and useful Improvements in the Meter for Measuring Water and other Fluids, and that the following is a full, clear, and exact description of the principle or character which distinguishes my invention from all other things before known and of the method of making, constructing, and using the same, reference being had to the accompanying drawings, making a part of this specification, in which—

Figure 1 is a plan with the inclosing casing and one of the valves removed, the better to exhibit the internal arrangement. Figs. 2 and 3 vertical sections taken at the lines A *a*, and B *b*, of Fig. 1; Fig. 4 a plan, and Figs. 5 and 6 vertical sections taken at the lines C, *c*, and D, *d* of Fig. 4 of a modification of my improved instrument intended for the measurement of large quantities of fluid.

In this instrument I employ the hydrostatic or mechanical pressure of the fluid to be measured in its course from the source to the place of delivery to operate the mechanism which determines and indicates the quantity of fluid which passes through whether the instrument be applied to the measuring of the quantity of water which passes through pipes or conductors, such as the main and branch pipes for supplying cities, or for ascertaining the quantity of water fed into a steam boiler in any given time, or for measuring the quantity of fluid put into casks or tanks by means of pumps, siphons or other devices, or to the measuring of liquids for any other purpose.

But the leading object of my invention is to measure the quantity of water which passes through the main and branch pipes for the supply of cities. It is therefore important that the said instrument should possess the combined properties of cheapness of construction, accuracy of measurement, simplicity, compactness and durability.

To these ends the principle or character which distinguishes my invention from all other things before known, in an instrument having two cylinders provided with pistons connected with cranks at right angles or such other angles as will enable the pistons alternately to act on the crank shaft to rotate it consists in connecting the two pistons with their cranks so that while the shaft is impelled by one piston the other shall remain at rest at the end of each stroke, until the shifting of the valves is completed for the purpose of insuring the accurate measurement of the fluid passing through and acting as the motive force.

My invention in the above apparatus also consists in determining the range of motion of the pistons by means of stops at each end connected with the cylinders and pistons instead of doing this by the cranks, by reason of which I am enabled to measure the fluid passing through with the utmost accuracy, a result which could not be obtained, if the motions of the pistons were determined by the crank, for the least wear of either the crank pin, or the journals of the shaft, or the boxes in which these work, or the slightest change in the position of the cylinders relatively to the parts with which the pistons are connected, occasioned by strain or wear, would of necessity vary the amount of water discharged at each stroke.

My invention in the before mentioned apparatus also consists in attaching to the instrument an outer casing through which the fluid to be measured passes and from which it enters the cylinders, which casing incloses the valves and valve gear as also the other moving parts and the upper ends of the cylinders, that the various moving parts may work in the fluid to be lubricated thereby, while at the same time the various joints are protected by being pressed with a nearly equal pressure on all sides by the fluid, and also avoiding the use of packing boxes for the sliding parts of the mechanism.

In Figs. 1, 2, and 3 of the accompanying drawings (*a*) represents the base of the instrument the upper surface of which is to be properly adapted to the reception of the other parts to be hereinafter described. This base is formed with two recesses (*b*, *b*,) which constitute the lower halves of two cylinders in which the pistons are to work and each recess is formed with a port (*c*) which is alternately an induction and eduction port. Around each of these recesses the base is provided with bolt holes (*d*) to admit of securing the upper part (*e*) of the cylinders formed with projecting flanches (*f*,) through which the securing bolts pass. Between the parts (*e*, *e*,) and the base is interposed suitable packing (g) to form when bolted together water tight joints. This packing around the periphery of the cylinders constitutes the packing of the pistons, and it is formed for each cylinder of a flat ring of metal (h,) with two rings of leather (i, i,) one above and the other below, whose inner edges are turned at right angles to fit the cylindrical surface of the pistons. The parts (e) of the cylinders are each formed with a port (j) which is alternately an induction and eduction port. And they are also each provided with a water way (k,) which forms the continuation of the port (c) of the lower part (b) of the cylinders. Where the ports (j,) and (k,) issue out the surfaces are properly planished to form seats for valves (l, l,) such as are used in high pressure steam engines, and between the two ports (j, k,) and (j, k,) there are eduction ports (m m,) which—as indicated by dotted lines—communicate with an eduction pipe (n,) to which may be coupled a pipe leading to any desired receptacle. In Fig. (1) one of the valves (l) is omitted to represent the three ports.

Referring to Fig. 2, the piston (p) is made cylindrical on its outer periphery and fitted to slide within the leather packing rings (i, i,) before described which, being forced by the pressure of the water against the periphery of the piston, not only make the joint water tight, but at the same time wipe off all the water to insure accurate measurement of water at each operation. The rod (q) of the piston passes through a hole in the top (e) of the cylinder which is surrounded with india rubber packing (r) confined by a cap plate (s) to prevent leakage. The upper end of the piston rod is formed with a yoke (t) having a horizontal slot (u) which plays on a crank pin (v) on one end of a horizontal shaft (w) which shaft has its bearings in boxes (x, x,) attached to the top of the cylinder. The diameter of the crank pin is less than the capacity of the slot, so that at the end of each stroke the crank shall pass through a portion of its rotation without moving the piston. The extent of this independent motion is indicated by a triangle drawn in red lines. The range of motion of the piston is determined in the upward stroke by the contact of a washer (y,) with the under face of the cylinder top, and in the downward stroke by the contact of the yoke (t) and the collar (z) of the cap plate (s). In this way the motions of the piston are exactly determined, this being essential to the accurate measurement of water.

The crank shaft carries two eccentrics (a' a') embraced each by a yoke (b') jointed to its appropriate slide valve (l,). The two crank pins on the shaft are at right angles so that when one passes the dead point the other will be at the full length of its leverage, that the two pistons may act in succession.

Instead of constructing the pistons and connecting them with the crank pins as above described and represented in Fig. 2 I contemplate sometimes adopting the arrangement represented in Fig. 3, where it will be seen that the piston rod (q) is of a much greater diameter, and hollow at the upper end to receive one end of a connecting rod (c') jointed therein at (d'), and instead of the horizontal slot in the yoke to form the connection with the crank pin (v) the upper end of the connecting rod has a hole (e') so elongated as at the end of the up and the down stroke to permit the crank shaft to have an independent motion as in the first example. The range of motion of the piston is regulated (in this arrangement) in the downward stroke by a projection (f') at the bottom of the cylinder, and in the upward stroke by a shoulder (g') on the piston rod which comes in contact with the collar (z) of the cap plate (s) which in this arrangement is inverted the cap plate being made in two parts to secure the packing (r).

The whole apparatus is inclosed by a casing (h') secured, with packing interposed to the base by screw bolts which pass through appropriate flanches in the casing and through holes (i') in the base (a).

In the crank shaft there is another eccentric (j') embraced by a fork (k') on one end of an arm (l') attached to a spindle (m') which passes through a hole in the outer casing and is there packed with india rubber (n') confined by a cap (o'). The spindle (m') is connected with any registering apparatus that will indicate the number of vibrations which the fork receives from the eccentric on the crank shaft.

The water is introduced into the inside of the casing through an induction pipe (p') which may be coupled with a pipe leading from any place desired.

As the water enters under the pressure of a head and fills up the casing, it passes through the open port (j) of one of the cylinders and forces down the piston, and as the opening of the port (j) by the valve opens the connection between the exhaust port (m) and the other port (k), the downward motion of the piston expels the water from below the piston. The motion of the piston and the course of the water under this state of things is indicated in Fig. 3 by arrows. And the position of the parts in the other cylinder is represented in Fig. 2, where it will be seen that the piston is at the end of the down stroke. For the accurate measurement of the fluid it is necessary after the piston has completed its stroke that it should remain at rest until the valve shall have been shifted so as to connect the port through which the water entered the cylinder with the exhaust port, and to open the other port that the induction water may enter below the piston to force it up and thereby expel the water which has been measured above it. The motion of the valve to effect this change is obtained from the crank shaft which is then impelled, during the repose of one piston, by the descending motion of the other piston, the play given to the connection of each piston with the crank pin admitting of the rest of one piston at the end of each stroke, while the crank shaft is continued in motion by the other piston. It will be obvious that the same result will be produced by the up motion of the two pistons, the two alternately impelling the crank, which in consequence continues to rotate and to shift the valves alternately while the pistons are alternately at rest.

By reason of the shifting of the valves while the piston is in a state of rest the quantity of water introduced and expelled from the cylinder at each stroke must be accurately measured.

It will be seen from the foregoing that all the moving parts work in water and that the valves are nearly in equilibrio as the pistons have only to carry the friction of the moving parts hence there will be very little wear and very little liability to derangement.

The mode of making the packing for the pistons by means of rings of leather is similar to the mode long since practiced in packing the piston of pumps for impelling fluids; but when the action is reversed and the piston impelled by the fluid, if the packing rings be attached to the piston as heretofore, the edge of the leather ring is pressed against the cylinder so that the motion of the piston tends to tear the leather, particularly at the angle; and to avoid this injurious tendency which would be a serious defect in an instrument of this kind, I reverse the arrangement and attach the packing rings to the cylinder and place the pistons within them.

In the modification represented in Figs. 4, 5, and 6, the two cylinders ($a^2$ $a^2$) are in the same line with the dividing space ($b^2$) separated from them by heads ($c^2$ $c^2$) through which the piston rods ($d^2$ $d^2$) pass with appropriate packing. The pistons are formed each of a disk ($e^2$) properly secured to a piston rod, and the periphery is packed by means of two leather rings ($f^2$ $f^2$). The flat part of these leather rings is secured to the disk by metal rings ($g^2$ $g^2$) bolted through, and the cylindrical part bearing against the inner periphery of the cylinder.

The two cylinders are formed each with two ports ($h^2$ $h^2$) one at each end governed by a slide valve ($i^2$) the motion of which alternately connects one of them with the exhaust port ($j^2$), the two exhaust ports leading to the eduction passage ($k^2$). The two valves are operated by eccentrics on the crank shaft ($l^2$) as in the first example before described, and the crank shaft with the two crank pins ($m^2$ $m^2$) receives motion alternately from the two pistons by the interposition of two rock shafts ($n^2$ $n^2$), connecting rods from the rockers extending up to the crank pins as indicated by dotted lines. The connection of the connecting rods with the crank pins is to be made as represented in Fig. 3.

The upper part of the instrument is inclosed by a casing ($o^2$) provided with an induction passage.

In this last described modification I do not make use of the reversed arrangement of the leather packing rings as described in connection with the first and second arrangement, as my improved mode of packing, for convenient attachment, requires the cylinders to be made each in two parts to admit of inserting the packing rings.

I have herein described various modes of applying the principle of my invention, but I wish it to be distinctly understood that I do not limit myself to these as the principle of my invention may be susceptible of other modifications.

The advantages of my improved instrument are the great accuracy with which fluids can be measured by reason of determining the stroke of the pistons independently of the crank by means of stops connected with the cylinders and pistons and of the completion of the motion of the valves while the pistons are at rest at the end of each stroke, and the durability of the moving parts and joints which have little or no tendency to wear or get out of order, or to leak, by reason of inclosing them in an outer casing through which the fluid to be measured passes; for the moving parts are thus constantly kept in a lubricated state, the valve rods are not required as in steam engines to pass through stuffing boxes, and the packed joints, instead of being exposed to outward pressure only, are pressed on all sides by equal or nearly equal forces. The mode of making the packing for the pistons not only renders it less liable to wear and tear but ensures at all times a tight joint, and has the effect, by wiping off the surface of the pistons at each stroke, to render the measuring of the water more accurate, and finally it will be seen that by reason of my improvement I am enabled to employ slide valves to advantage for the reason that as the only resistance to the motion of the pistons is the working of the valves and the friction of the moving parts which, working at all times in the fluid, will be balanced, it follows that the pressure of the issuing fluid against the under face of the valves will be nearly equal to the pressure of the entering fluid on their upper surface, thus keeping them nearly in a state of equilibrium and working with very little friction.

What I claim as my invention and desire to secure by Letters Patent is—

1. Connecting the two pistons with the two cranks of a crank shaft, in manner substantially as described, so that at the end of each stroke of either of the pistons it shall remain at rest while the crank shaft is being impelled by the other piston, so that the valves shall be shifted while the piston is at rest, for the purpose substantially as described.

2. I also claim, in an instrument for the purpose herein specified, determining the range of motion of the pistons by means of stops connected with the cylinders and the pistons, substantially as described, in combination with the connection of the pistons with the crank or cranks, by means of a joint having sufficient play to permit the pistons alternately to remain at rest while the crank shaft continues to rotate substantially as described.

3. I also claim inclosing all the moving parts of an instrument substantially such as above described in the surrounding casing through which the water or other fluid passes to be measured, constructed and operating in the manner and for the purpose substantially as described.

J. ERICSSON.

Witnesses:
 CAUS BROWNE,
 ALLEN PORTER BROWNE.